(12) United States Patent
Kubik et al.

(10) Patent No.: US 11,353,843 B2
(45) Date of Patent: Jun. 7, 2022

(54) AUTOMATIC EVALUATION OF A MACHINE BEHAVIOUR

(71) Applicant: SIEMENS AKTIENGESELLSCHAFT, Munich (DE)

(72) Inventors: Alexander Kubik, Erlangen (DE); Philipp Rost, Fürth (DE); Elmar Schäfers, Fürth (DE); Torsten Schür, Erlangen (DE); Stephen J. Yutkowitz, Cincinnati, OH (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 280 days.

(21) Appl. No.: 16/644,094

(22) PCT Filed: Aug. 23, 2018

(86) PCT No.: PCT/EP2018/072743
§ 371 (c)(1),
(2) Date: Mar. 3, 2020

(87) PCT Pub. No.: WO2019/048246
PCT Pub. Date: Mar. 14, 2019

(65) Prior Publication Data
US 2020/0192326 A1    Jun. 18, 2020

(30) Foreign Application Priority Data

Sep. 5, 2017 (EP) .................................. 17189389

(51) Int. Cl.
*G05B 19/4065* (2006.01)
(52) U.S. Cl.
CPC ............... *G05B 19/4065* (2013.01); *G05B 2219/34427* (2013.01); *G05B 2219/37234* (2013.01)
(58) Field of Classification Search
USPC ........................................................ 700/159
See application file for complete search history.

(56) References Cited

U.S. PATENT DOCUMENTS 6,281,650 B1    8/2001  Yutkowitz
6,625,502 B2 *  9/2003  Ito .................... G05B 13/024
                                                            700/69

(Continued)

FOREIGN PATENT DOCUMENTS

DE    202008016304        *   3/2009
DE    202008016304 U1        3/2009

(Continued)

OTHER PUBLICATIONS

Anonymous, "Series 373x Electropneumatic Positioner", 2006, XP055424499, http://samson.de. (English) (Year: 2006).*

(Continued)

*Primary Examiner* — Hien D Khuu
(74) *Attorney, Agent, or Firm* — Henry M. Feiereisen LLC

(57) ABSTRACT

An actuator of a machine is controlled by a control device with a controller structure in a normal operating mode and a special operating mode. The control device determines from a position setpoint value and a position actual value a control signal for the actuator. In the normal operating mode, the setpoint values are determined using a utility program, and in the special operating mode by a system program that is different from the normal operating program. In the special operating mode, a frequency characteristic for the actuator is determined on the basis of the sequence of setpoint values and associated actual values, and an evaluation for the actuator and/or of the controller structure is performed using the frequency characteristic and parameters of the controller structure. Depending on the evaluation, a message is transmitted to an operator of the machine or to a computing device over a network.

18 Claims, 5 Drawing Sheets

(56) References Cited

U.S. PATENT DOCUMENTS 6,844,693 B2 * 1/2005 Tazawa ................ H02P 6/06
318/609
2010/0292813 A1 11/2010 Boiko et al.

FOREIGN PATENT DOCUMENTS

EP          2270616      *   1/2011
EP          2270616 A2       1/2011

OTHER PUBLICATIONS

Anonymous: "Stellunqsreqler Serie 373x Ventildiagnose EXPERTplus", XP055424499, Gefunden im Internet: URL:http://www.samson.de [gefunden am Nov. 14, 2017], the whole document; 2008.
PCT International Search Report and written opinion of International Searching Authority dated Oct. 11, 2018 corresponding to PCT International Application No. PCT/EP2018/072743 filed on Aug. 23, 2018.

* cited by examiner

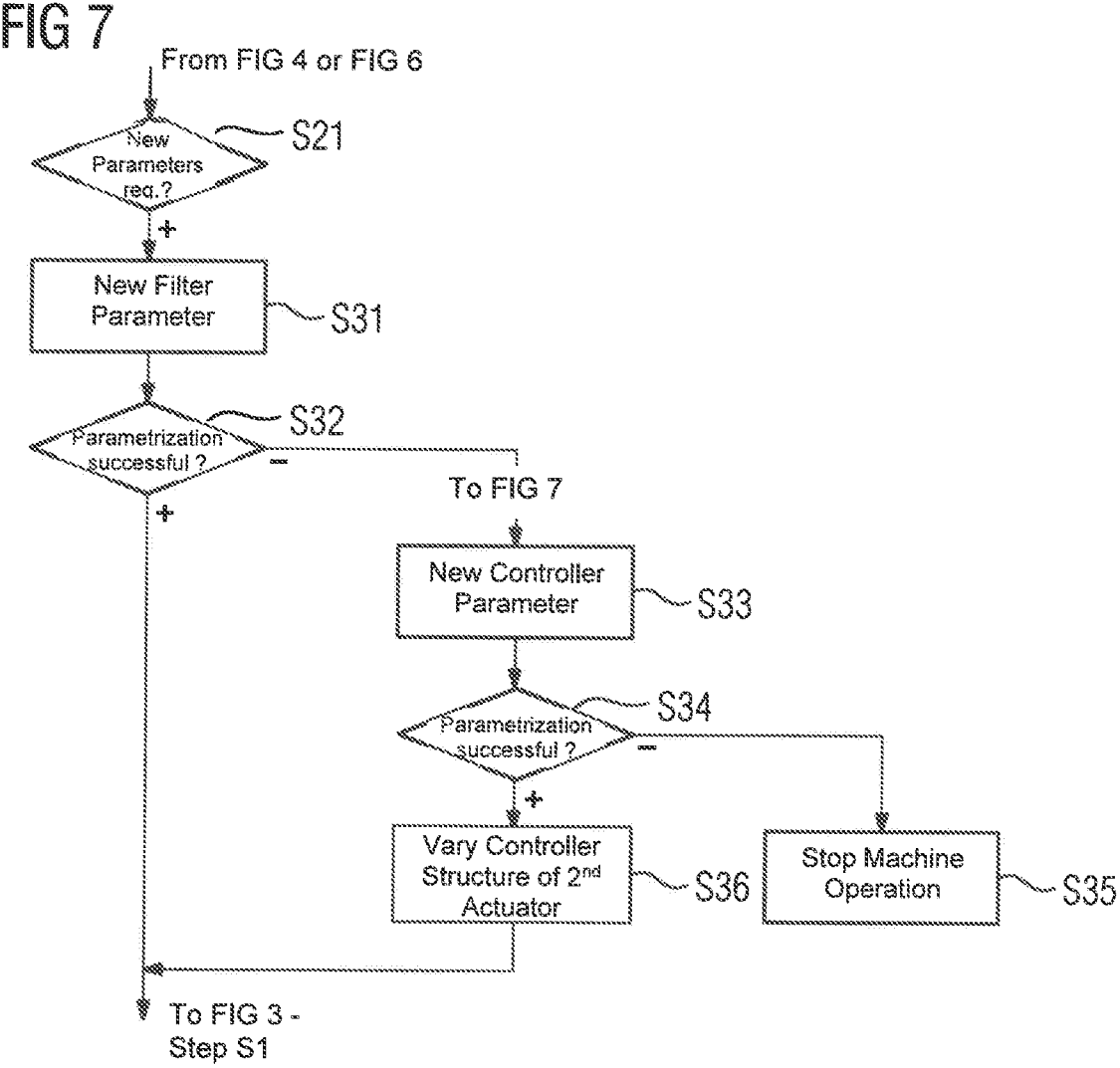

AUTOMATIC EVALUATION OF A MACHINE BEHAVIOUR

CROSS-REFERENCES TO RELATED APPLICATIONS

This application is the U.S. National Stage of International Application No. PCT/EP2018/072743, filed Aug. 23, 2018, which designated the United States and has been published as international Publication No. WO 2019/048246 A1 and which claims the priority of European Patent Application, Serial No. 17189389.4, filed Sep. 5, 2017, pursuant to 35 U.S.C. 119(a)-(d).

BACKGROUND OF THE INVENTION

The present invention relates to an operating method for a machine, for example a production machine, in particular a machine tool,
  wherein the machine has a first actuator,
  wherein the first actuator is controlled by a control device for the machine,
  wherein the control device implements a controller structure for controlling the first actuator,
  wherein, in both normal operating mode and also in a special operating mode of the machine, the control device in each case cyclically specifies to the controller structure a setpoint value for an action to be executed by the first actuator from a corresponding sequence of setpoint values and the controller structure in each case accepts said setpoint value and an actual value for an action executed by the first actuator, determines a control signal for the first actuator as a function of the setpoint value and the actual value and controls the first actuator according to the control signal determined,
  wherein, in the normal operating mode, the setpoint values are determined by the control device using a utility program and, in the special operating mode, they are determined using a system program different from the utility program,
  wherein, in the special operating mode, the control device captures the actual values resulting from the setpoint values and uses the sequence of setpoint values and associated captured actual values specified in the special operating mode to determine a frequency characteristic for the first actuator.

The present invention further relates to a system program for a control device for a machine, wherein the system program comprises machine code that can be executed directly by the control device, wherein the execution of the machine code by the control device causes the control device to operate the machine in accordance with such an operating method.

The present invention further relates to a control device for a machine, wherein the control device is programmed with such a system program so that the control device operates the machine in accordance with such an operating method.

The present invention further relates to a machine, for example a production machine, in particular a machine tool
  wherein the machine has a first actuator,
  wherein the first actuator is controlled by a control device for the machine,
  wherein the control device is embodied as explained above.

Machine-dynamic behavior can be mapped by frequency characteristics. From the viewpoint of control engineering, frequency characteristics are, so to speak, the machine's finger print. In particular, changes to the machine dynamics are also evident in the frequency characteristics.

The controller structures for the machine—i.e. in the present case, the controller structure for the first actuator are parameterized such that the associated control loop is stable in every operating mode of the machine. However, strictly speaking, the stability only applies at the time of parametrization. If the machine-dynamic behavior of the machine changes subsequently this can result in a previously stable control loop becoming unstable. In this case, it is necessary to reset the controller structure. Furthermore, such changes to the machine-dynamic behavior can be indicative of changes to components.

If the control loop becomes unstable, the prior art requires the machine to be shut down and re-parameterized. Otherwise, the machine would produce rejects or possibly even suffer damage. Furthermore, if the instability is attributable to defective components, the defective component has to be replaced. Searching for the defective component is often tedious and time-consuming.

Already known from the prior art is the capture and evaluation of a frequency characteristic for a control loop. The evaluation takes the form that parameters from the controller structure are determined on the basis of the frequency characteristic and the controller structure is parameterized in accordance with the determined parameters. Purely by way of example, reference can be made to U.S. Pat. No. 6,281,650 B1 or the function manual for special functions of the SINUMERIK 840D sl/828D—see Chapter 12.

The manual "Series 373x Positioners—EXPERTplus Valve Diagnostics" from Samson AG, Operating Instructions EB 8389, Firmware Version 1.5x, Edition July 2008, pages 1 to 60 disclose diagnostic software for a positioner. The diagnostic software is integrated in the positioner. It can be used both while the process is running (automatic mode) and in manual mode (MAN). In automatic mode, the positioner continuously follows the specified reference variable, in manual mode it follows a reference variable given over local operation or over acyclic communication. In manual mode, inter alia, various test functions are possible. During the reference run, the valve moves through its working range. During this, various error messages and status messages can be generated and output. The status messages can be shown on a display on the positioner represented by a code. During one of the reference runs, the control signal change is determined as a function of the valve setting. Furthermore, while the plant is running, observer functions can be carried out which, when evaluated, can also be indicative of an error.

DE 20 2008 016 304 U1 discloses an appliance for monitoring a drive unit. This appliance is able to regulate the dynamic behavior of the drive unit.

The object of the present invention consists in the provision of possibilities to enable the dynamic behavior of a machine to be monitored in a simple and reliable manner.

SUMMARY OF THE INVENTION

The object is achieved by an operating method for a machine with as set forth hereinafter. Advantageous embodiments of the operating method are the subject matter of dependent claims.

According to the invention, an operating method of the type named in the introduction is embodied such that, in the special operating mode, the control device uses the frequency characteristic and parameters from the controller structure to determine an evaluation for the first actuator and/or the controller structure and decides in dependence on the evaluation whether to transmit a message, and, if applicable, which message, to an operator of the machine or to a computing device over a computer network.

A frequency characteristic usually comprises a gain and the phase angle as a function of the frequency. Accordingly, the gain and/or a phase response of the frequency characteristic are preferably included in the evaluation. In particular, the control device can determine zeros and poles of the frequency characteristic and the evaluation and determine the evaluation using the zeros and poles of the frequency characteristic and the parameters from the controller structure.

If applicable, it is possible for the control device only to output the message per se. However, preferably, the control device also additionally determines on the basis of the evaluation whether it is necessary to redetermine the parameters from the controller structure and, if applicable, redetermines the parameters from the controller structure.

The parameters from the controller structure can comprise different parameters. In particular, they can comprise parameters which the control device varies during the redetermination of the parameters from the controller structure and parameters which the control device retains. Hereinafter, the parameters which the control device varies are referred to as first parameters and the other parameters as second parameters.

Preferably, the system program defines which of the parameters from the controller structure are first parameters and which are second parameters.

Preferably, the first parameters comprise filter parameters, which are used to filter the actual values or the difference between the setpoint values and the actual values in a filter before the determination of the respective manipulated variable. This enables the controller structure for the first actuator to be adjusted independently of controller structures for any other actuators.

If applicable, the first parameters can additionally comprise controller parameters, which are used by the controller on the basis of the setpoint values and the filtered actual values or the filtered differences between the setpoint values and the actual values to determine the respective manipulated variable. In this case, the control device preferably only varies the controller if, despite the variation of the filter parameters, the evaluation for the first actuator and/or the controller structure remains below a minimum evaluation. Furthermore, in the case of a variation of the controller parameters, the control device simultaneously also varies corresponding parameters from the controller structure of at least one second actuator of the machine in a similar manner.

It is possible for the control device to change cyclically from the normal operating mode to the special operating mode, for example once a day or once a week. Alternatively or additionally, it is possible for the control device to change from the normal operating mode to the special operating mode at the request of an operator.

In many cases, it is possible to determine on the basis of the frequency characteristic specifically whether a component, and, if applicable, which component, of the first actuator is defective. In this case, the message can be a message relating to a corresponding defect in the first actuator.

It is possible for the operating method to be carried out purely locally on the part of the control device. However, preferably the control device files the determined frequency characteristic in a memory device over the computer network and/or retrieves criteria for determining the evaluation and/or values for permissible and impermissible evaluations from the memory device over the computer network.

The object is furthermore achieved by a system program with the features of claim 14. According to the invention, the execution of the machine code by the control device causes the control device to operate the machine in accordance with an operating method according to the invention.

The object is furthermore achieved by a control device which according to the invention is programmed with a system program according to the invention so that the control device operates the machine in accordance with an operating method according to the invention.

The object is furthermore achieved by a machine which according to the invention includes a control device as set forth above.

BRIEF DESCRIPTION OF THE DRAWING

The above-described properties, features and advantages of this invention and the manner in which these are achieved will become clear and more plainly comprehensible in conjunction with the following description of the exemplary embodiments explained in more detail in conjunction with the drawings. The drawings show in schematic form.

DETAILED DESCRIPTION OF PREFERRED EMBODIMENTS

Figure 1:
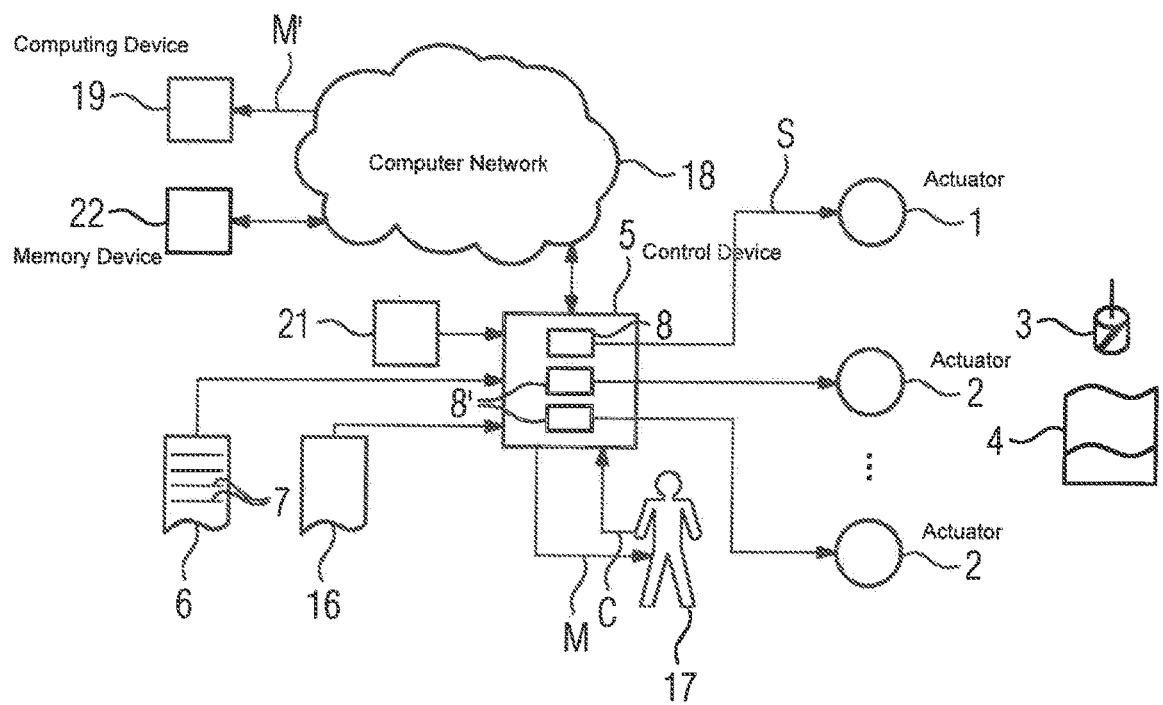
FIG. 1 a production machine,
FIG. 2 a controller structure,
FIG. 3 a flowchart,
FIG. 4 a flowchart,
FIG. 5 a frequency characteristic,
FIG. 6 a flowchart, and
FIG. 7 a flowchart.

According to FIG. 1, a machine has an actuator 1. In principle, the actuator 1 can be any actuator, for example a current regulator. The actuator 1 is often a mechanical actuator, for example a position-controlled or speed-controlled axis of a production machine, in particular a machine tool.

It is possible for the actuator 1 to be the sole actuator in the machine. However, often further actuators 2 are provided. This is often the case in particular with a production machine. The following generally only considers the actuator 1. Therefore, in the following it will be referred to as the first actuator to distinguish it from the other actuators 2. The further actuators 2 are referred to as second actuators. The second actuators 2 can in principle also be of any type. In particular in the case of a production machine, these are generally also mechanical actuators, in particular position-controlled or speed-controlled axes of the production machine. For example, the actuators 1, 2 can be used for the translatory positioning and/or rotatory orientation of a tool 3 relative to a workpiece 4.

The actuators 1, 2 are controlled by a control device 5 for the machine. The control device 5 is programmed with a system program S. The system program 6 comprises machine code 7 that can be executed directly by the control device 5. The execution of the machine code 7 by the control device 5 causes the control device 5 to operate the machine in accordance with an operating method, which will be explained in more detail below.

Figure 2:
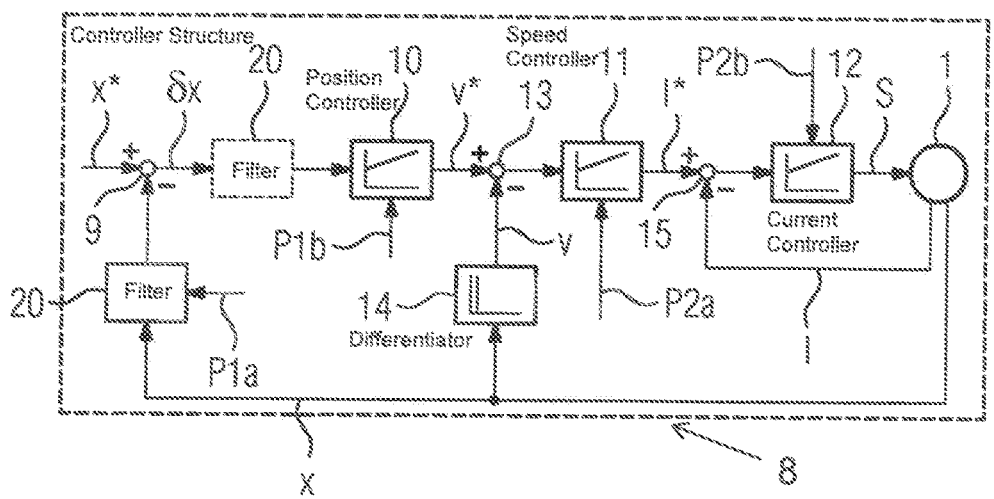

According to the depiction in FIG. 2, the control device 5 implements a controller structure 8 to control the first actuator 1. If the second actuators 2 are present, the control device 5 can implement similar or even different controller structures 8' to control the second actuators 2.

The controller structure 8 has a nodal point 9. The nodal point 9 is supplied with a setpoint value x* for an action to be executed by the first actuator 1. The setpoint value x* is specified to the controller structure 8 or the nodal point 9 by the control device 5. In the example shown position control—the setpoint value x* is a position setpoint value. If the first actuator 1 were embodied as a speed-controlled axis, the setpoint value x* would be a speed setpoint value.

The controller structure 8 accepts the setpoint value x*. It furthermore accepts an actual value x for an action executed by the first actuator 1. In the example shown—position control—the actual value x is an actual position. The difference between the setpoint value x* and the actual value x (control deviation 4) is formed in the nodal point 9 and supplied to a controller 10. The controller 10 can, for example, be embodied as a PI controller. However, it can also have a different embodiment. The controller 10 determines a control signal S for the first actuator 1 as a function of the setpoint value x* and the actual value x. The first actuator 1 is controlled by the controller structure 8 according to the control signal S determined.

In accordance with the depiction in FIG. 2, the controller structure 8 often comprises not only the controller 10, but also controllers 11, 12 that are subordinate to the controller 10. For example, in the case of position control, a speed controller 11 and a current controller 12 can be subordinate to the controller 10 (=position controller). In this case, the controller 10 does not determine the control signal S directly, but determines a speed setpoint value v* and supplies the speed setpoint value v* to the speed controller 11 via a further nodal point 13. Furthermore, a speed actual value v is supplied to the further nodal point 13. The speed actual value v can, for example, be derived by means of a differentiator 14 from the actual value x (i.e. in the case of position control, the actual position). According to the controller structure 8 in FIG. 2, the speed controller 11 determines a current point value I*, which it supplies to the current controller 12 via a further nodal point 15. Furthermore, a current actual value I is also supplied to the current controller 12 via the further nodal point 15. The current controller 12 then determines the control signal S.

The embodiment explained above is often in particular implemented when the corresponding actuator 1, 2 is embodied as a position-controlled axis. However, in principle, the controller structure 8 can also be embodied differently. For example, in the case of a speed-controlled axis, the controller 10 is already a speed controller which can in turn have a subordinate current controller. However, the principle in accordance to the invention is also applicable in this case.

Regardless of the specific embodiment, the controller structure 8 operates in a clock cycle. With a predetermined operating cycle of, for example, 8 kHz, the above-explained procedure is therefore repeated in each case with new values. It is, therefore carried out cyclically. With each operating cycle therefore, the control device 5 supplies the controller structure 8 with a new setpoint value x* in each case and the controller structure 8 accepts the new setpoint value x* and also a new actual value x and redetermines the control signal S.

The above procedure is on the one hand carried out in a normal operating mode der machine. In the normal operating mode, the control device 5 determines the setpoint values x* using a utility program 16. In the case of a production machine, the utility program 16 can, for example, be a so-called parts program. The normal operating mode is explained in more detail below in conjunction with FIG. 3.

Figure 3:
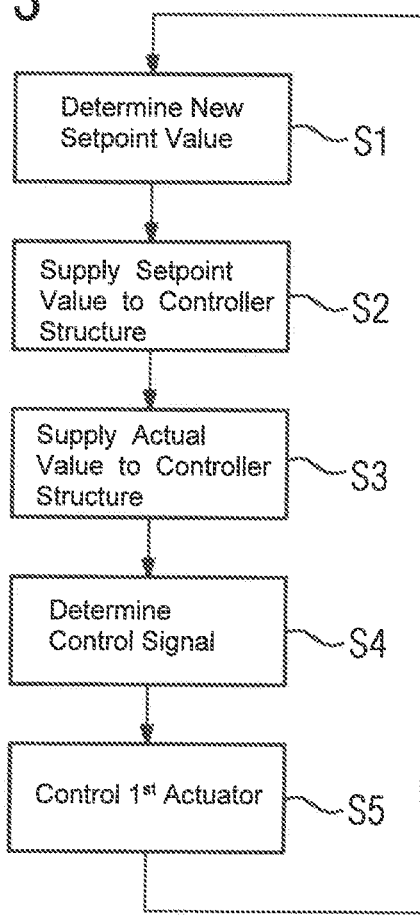

According to FIG. 3, in a step S1, the control device 5 uses the utility program 16 to determine a new setpoint value x*. In a step S2, the control device 5 supplies the setpoint value x* to the controller structure 8 which accepts the setpoint value x*. In a step S3, the controller structure 8 accepts the temporally associated actual value x. In a step S4, the controller structure 8 determines the control signal S. In a step S5, the controller structure 8 controls the first actuator 1 according to the control signal S determined. This procedure is repeated cyclically with the operating cycle.

On the other hand, the above procedure is also carried out in a special operating mode of the machine. However, in the special operating mode, the control device 5 determines the setpoint values x* using the system program 6. Furthermore, the control device 5 takes further measures in this case. The special operating mode is explained in more detail below in conjunction with FIG. 4.

The special operating mode also contains the steps S2 to S5 in FIG. 3. However, the step S1 is replaced by a step S11 since, in the context of FIG. 4, the control device 5 determines the setpoint value x* using the system program 6. Otherwise, the step S11 corresponds to the step S1 in FIG. 3. Furthermore, steps S12 to S17 are present.

Figure 5:
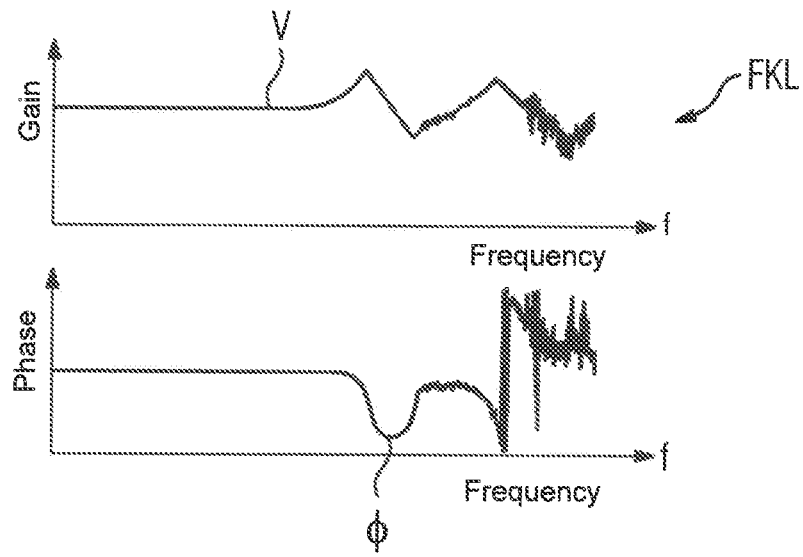

In the step S12, the control device 5 stores the actual value x captured in each case. Hence, the sequence of actual values x is available to the control device 5 for later evaluations. In a step S13, the control device 5 determines a frequency characteristic FKL for the first actuator 1 on the basis of the sequence of setpoint values x* specified in the special operating mode and the associated captured actual values x. An example of such a frequency characteristic FKL is depicted in FIG. 5. According to the depiction in FIG. 5, the frequency characteristic FKL comprises a gain V and the phase angle φ, in each case as a function of the frequency f.

In the step S14, the control device 5 uses the frequency characteristic FKL and parameters P1a, P1b, P2a, P2b from the controller structure 8 to determine an evaluation B for the first actuator 1 and/or the controller structure 8.

The parameters P1a, P1b, P2a, P2b from the controller structure 8 are values that are different from the variables from the controller structure 8. Variables are values that are specified anew to the controller structure 8 in each operating cycle, i.e. in particular the respective setpoint value x* and the respective actual value x. Parameters on the other hand are values that are only specified anew to the controller structure 8 only at significantly longer time intervals and only then only changed when necessary. In particular, these are neither captured actual values nor set point values specified in a clock cycle.

To determine the evaluation B, the control device 5 can in particular evaluate the gain V and/or the phase response of the frequency characteristic FKL. Therefore, the corresponding values can be included in the evaluation B. In particular, the control device 5 can determine zeros and poles of the frequency characteristic FKL and the evaluation B using the zeros and poles of the frequency characteristic FKL and the parameters P1a, P1b, P2a, P2b from the controller structure 8. In the step S15, the control device 5 checks whether the evaluation B determined lies within a predetermined framework, in particular does not fall below a minimum evaluation. At least when the minimum evaluation is undershot, in the step S16, the control device 5 transmits a message M to an operator 17 of the machine.

Alternatively or additionally, in the step S17, the control device 5 can transmit a message M' over a computer network 18 to a computing device 19. The computing device 19 is a computing device different from the control device 5.

Figure 4:
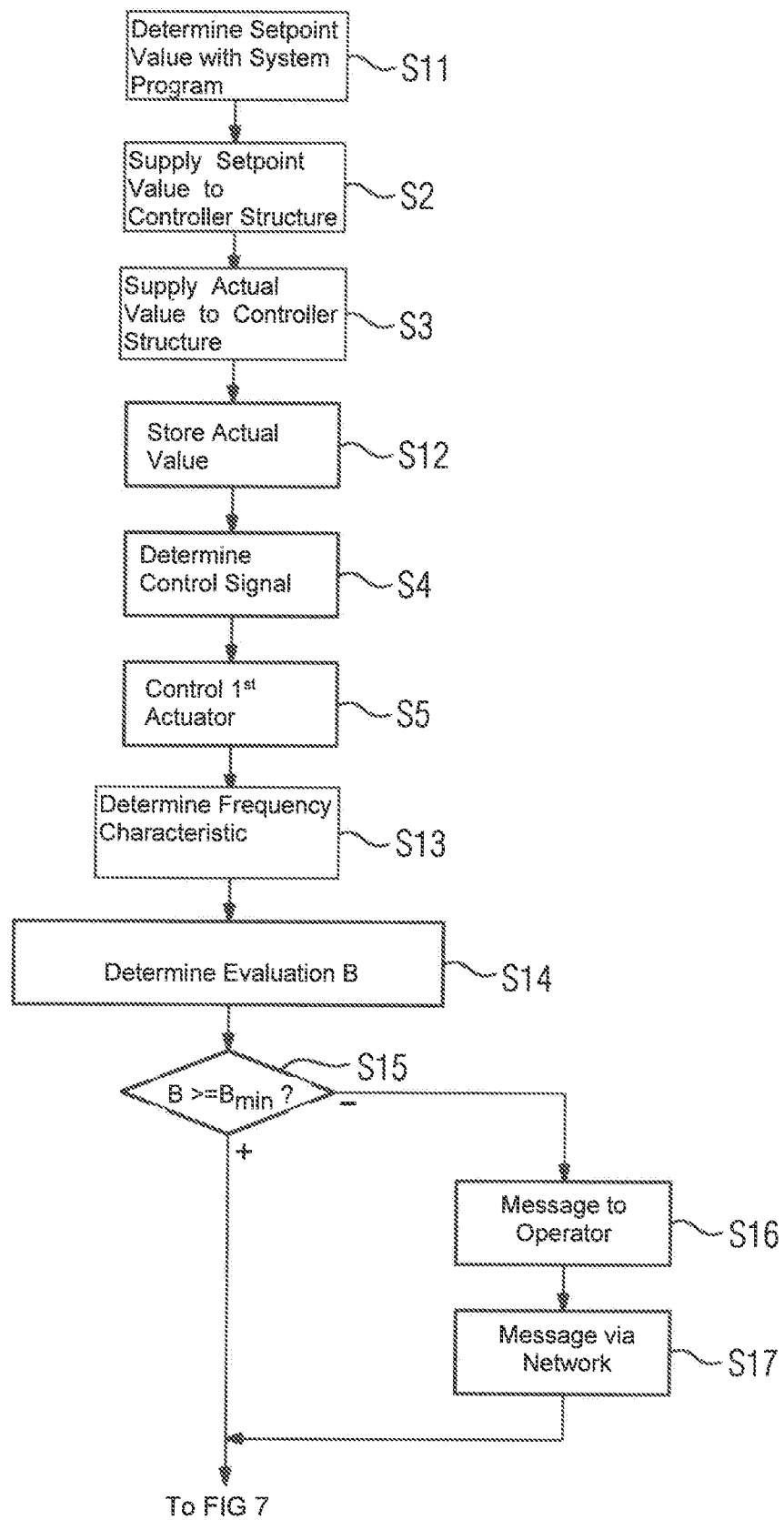
Figure 6:
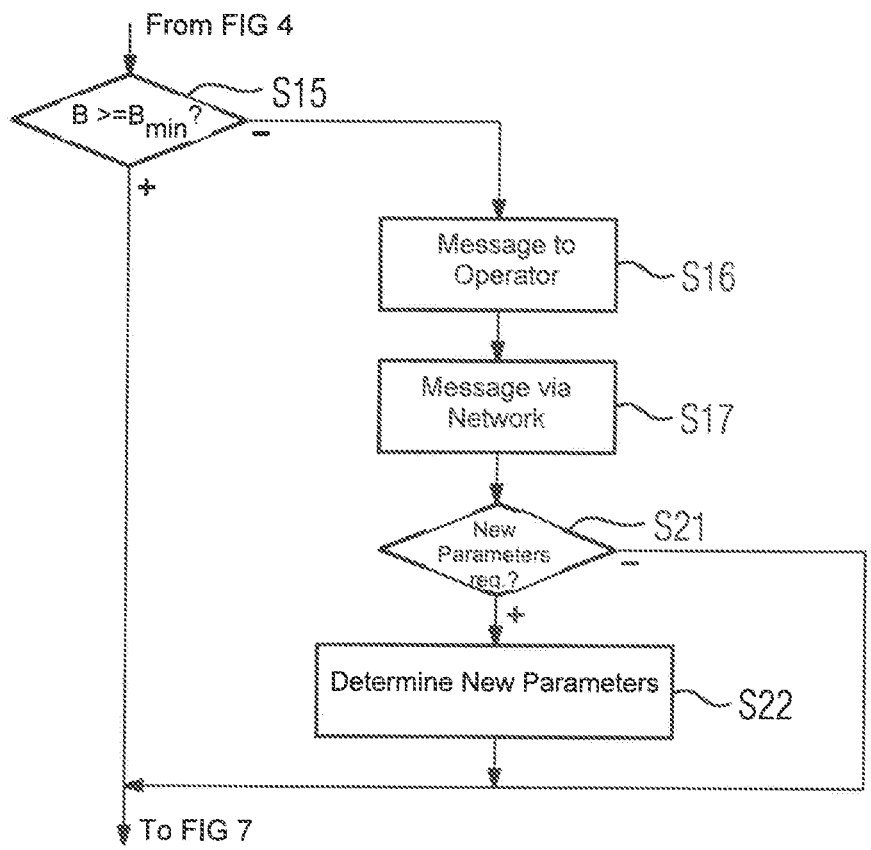

In the simplest case, the control device 5 only outputs the message M and/or the message M' and otherwise waits for an action, for example a re-parameterization of the controller structure 8 by the operator 17. However, the procedure in FIG. 4 is preferably supplemented by steps S21 and S22 according to the depiction in FIG. 6. In the step S21, the control device 5 checks on the basis of the evaluation B whether it is necessary to redetermine the parameters P1a, P1b, P2a, P2b from the controller structure 8. If this is the case, in the step S22, the control device 5 redetermines the parameters P1a, P1b, P2a, P2b from the controller structure 8.

The parameters P1a, P1b, P2a, P2b from the controller structure 8 comprise first parameters P1a, P1b and second parameters P2a, P2b. According to the depiction in FIG. 7, in the context of the redetermination of the parameters P1a, P1b, P2a, P2b from the controller structure 8, the control device 8 preferably only varies the first parameters P1a, P1b. In contrast, the second parameters P2a, P2b are retained. According to the depiction in FIG. 1, in particular the system program can define which of the parameters P1a, P1b, P2a, P2b from the controller structure 8 are first parameters P1a, P1b and which are second parameters P2a, P2b.

For example, according to the depiction in FIG. 2, the controller structure 8 often comprises a filter 20. It is—as depicted by solid lines in FIG. 2—possible for the actual values x to be supplied to the filter 20 and for the filter 20 to filter the actual values x. In this case, the controller 10 determines (directly or indirectly) the respective manipulated variable S on the basis of the setpoint values x* and the filtered actual values x. It is—as depicted by dashed lines in FIG. 2—alternatively possible for the control deviation $\delta_x$ to be supplied to the filter 20, i.e. the difference between the setpoint values x* and the actual values x. In this case, the controller 10 determines the respective manipulated variable S (directly or indirectly) on the basis of the filtered control deviation $\delta_x$.

According to the depiction in FIG. 2, the filter 20 can be parameterized. The filter 20 is, for example, parameterized by means of the first parameters P1a (filter parameters). The filter parameters P1a can, for example, specify a filter order and/or cut-off frequencies. Regardless of the type of filter parameters P1a, however, the actual values x or the control deviation are filtered before the determination of the respective manipulated variable S in the filter 20 using the filter parameters P1a.

Furthermore, it is also possible for the controller 10 to be parameterized. If applicable, the controller 10 is parameterized by means of the first parameters P1b (controller parameters). For example, in the case of a PI controller, the proportional gain and the integration time constant of the controller 10 can be parameterized. Regardless of the type of controller parameters P1b, the controller 10 determines the manipulated variable S from the control deviation $\delta_x$ supplied thereto using the controller parameters P1b.

If the control device 5 varies the parameters P1a, P1b, P2a, P2b from the controller structure 8, according to FIG. 7, in a step S31, the control device 5 preferably varies the filter parameters P1a. Then, in a step 832, the control device 5 checks whether the reparameterization was successful, i.e., whether the evaluation B is now in the permissible range, in particular is no longer below a minimum evaluation. If this is the case, the procedure in FIG. 7 is ended. Otherwise— and only then—the control device 5 proceeds to a step S33 in which the control device 5 varies the controller parameters P1b. The control device 5 then rechecks in a step S34 whether the reparameterization was successful. If this is the case, the procedure in FIG. 7 is ended. Otherwise, in a step S35, the control device 5 ends the further operation of the machine since, in this case, there is a risk of the production of rejects or damage to the machine. Alternatively, in this case, the control device 5 can change to an emergency mode.

In some cases, it is necessary for the controller structures 8' of the second actuators 2 to be parameterized in the same way as the controller structure 8 of the first actuator 1. However, this does not relate to the filter parameters P1a, but to the controller parameters P1b. Parameterization of this kind can, for example, be necessary if both the first actuator 1 and the second actuators 2 are embodied as position-controlled axes and the first actuator 1 and the second actuators 1, 2 act on a common device, for example the positioning of the tool 3 relative to the workpiece 4. In such a case, i.e. when similar parameterization of a plurality of controller structures 8, 8' is required, the step S34 is followed by a step 336. In the step S36, the control device 5 varies corresponding parameters from the controller structure 8' of at least one second actuator 2 of the machine in the same way as which it varied the controller parameters P1b of the controller structure 8 in the step 333.

The special operating mode can be carried out cyclically. This is indicated in FIG. 1 by a timer 21 which triggers transition into the special operating mode from time to time. For example, the machine operator will in each case generally perform a test run of the machine at longer time intervals (for example once a day or once a week). The transition to the special operating mode and the performance of the special operating mode can be embedded in this test run.

Alternatively or additionally, according to the depiction in FIG. 1, it is possible for the operator 17 to specify a special command C that directly causes transition into the special operating mode and the performance of the special operating mode. This enables the operator 17 to carry out the operating mode if this appears to be necessary.

The messages M, M' can be as required. In the simplest case, they only comprise the evaluation B per se. However, in some cases, it is possible to conclusively infer a malfunction of a specific component of the first actuator 1, for example a ball-and-screw spindle drive, from the frequency characteristic FKL—if applicable in conjunction with the parameters P1a, P1b, P2a, P2b from the controller structure 8. In this case, the message M, M' can relate directly to a corresponding defect in the first actuator 1 or the corresponding component of the first actuator 1.

It is possible for the control device 5 to carry out the operating method according to the invention entirely at local level, i.e., for there to be no electronic communication to any other technical device. For example, it not mandatory for the message M' to be transmitted to the computing device 19. However, it is preferable for it to be transmitted thereto. Furthermore, it is possible for the control device 5 to file the frequency characteristic FKL determined in an external memory device 22 via the computer network 18. Alternatively or additionally, the control device 5 can retrieve criteria for determining the evaluation B and/or values for permissible and impermissible evaluations from the external memory device 22 over the computer network 18. The memory device 22 can, for example, be part of a so-called cloud.

To summarize, the present invention relates to the following:

A machine has a first actuator 1 which is controlled by a control device 5 for the machine. The control device 5 implements a controller structure 8 for controlling the first actuator 1. Both in normal operating mode and in a special operating mode of the machine, the control device 5 cyclically specifies to the controller structure 8 a setpoint value x* for an action to be executed by the first actuator 1 from a corresponding sequence of setpoint values x* which the controller structure 8 accepts together with a value x for an action executed by the first actuator 1. The control device 5 determines a control signal S for the first actuator 1 as a function of the setpoint value x* and actual value x and controls the first actuator 1 accordingly. In the normal operating mode, the setpoint values x* are determined by the control device 5 using a utility program 16, whereas in the special operating mode using a system program 6 different therefrom. In the special operating mode, the control device 5 captures the actual values x resulting from the setpoint values x* and determines a frequency characteristic FKL for the first actuator 1 on the basis of the sequence of setpoint values x* specified in the special operating mode and the associated captured actual values x. On the basis of the frequency characteristic FKL and parameters P1a, P1b, P2a, P2b from the controller structure 8, the control device 5 determines an evaluation B for the first actuator 1 and/or the controller structure 8. Depending upon the evaluation B, the control device decides whether to transmit a message M, M', and, if applicable, which message, to an operator 17 of the machine or over a computer network 18 to a computing device 19.

The present invention has many advantages. In particular, early identification of problematic machine conditions is possible in a simple and reliable manner.

Although the invention has been illustrated and described in greater detail by the preferred exemplary embodiment, the invention is not restricted by the disclosed examples and other variations can be derived herefrom by the person skilled in the art without departing from the scope of protection of the invention.

What is claimed is:

1. A method for operating a machine, said method comprising:
controlling a first actuator of the machine with a controller structure implemented in a control device of the machine, wherein the first actuator is embodied as a position-controlled or speed-controlled axis; and
wherein the control device is configured to:
cyclically specifying to the controller structure, both in a normal operating mode and in a special operating mode of the machine, a setpoint value for an action to be executed by the first actuator selected from a sequence of setpoint values, wherein in the normal operating mode, the setpoint value is determined with the control device using a utility program and, in the special operating mode, the setpoint value is determined using a system program that is different from the utility program;
accepting with the controller structure the specified setpoint value and an actual value for the action executed by the first actuator, determining from the specified setpoint value and the actual value a control signal for the first actuator, and controlling the first actuator according to the determined control signal; and
in the special operating mode, capturing with the control device actual values corresponding to the sequence of setpoint values, determining a frequency characteristic for the first actuator from the sequence of setpoint values specified in the special operating mode and the captured actual values, determining based on the frequency characteristic and on parameters of the controller structure, an evaluation for the first actuator and/or of the controller structure, and deciding depending on the evaluation whether to transmit a message, and, if applicable, which type of message, to an operator of the machine or to a computing device over a computer network.

2. The method of claim 1, wherein the frequency characteristic comprises a gain and a phase angle as a function of frequency.

3. The method of claim 2, wherein the evaluation includes the gain and/or a phase response of the frequency characteristic.

4. The method of claim 1, further comprising determining with the control device zeros and poles of the frequency characteristic, and determining the evaluation using the zeros and poles of the frequency characteristic and the parameters of the controller structure.

5. The method of claim 1, further comprising checking with the control device based on the evaluation whether it is necessary to redetermine the parameters of the controller structure and, if applicable, redetermining the parameters of the controller structure.

6. The method of claim 5, wherein the parameters of the controller structure comprise first and second parameters and wherein, when redetermining the parameters, the control device only varies the first parameters while retaining the second parameters.

7. The method as claimed in claim 6, wherein the system program defines which of the parameters are the first parameters and which of the parameters are the second parameters.

8. The method of claim 6, wherein the first parameters comprise filter parameters of a filter which uses the filter parameters to filter the actual values or a difference between the sequence of setpoint values and the actual values before determining a respective manipulated variable.

9. The method of claim 8, wherein the respective manipulated variable is determined from the first parameters based on additional controller parameters that depend on the sequence of setpoint values and the filtered actual values or the filtered difference, and wherein the parameters of the controller structure are varied only when, despite a variation of the first filter parameters, the evaluation for the first actuator and/or the controller structure remains below a minimum evaluation.

10. The method of claim 9, further comprising, when the controller parameters of the controller structure are varied, varying the controller parameters of at least one second actuator of the machine, which is also embodied as the position-controlled or speed-controlled axis.

11. The method of claim 1, wherein the control device transitions from the normal operating mode to the special operating mode cyclically and/or at the request of an operator.

12. The method of claim 1, wherein the message relates to a defect in the first actuator.

13. The method of claim 1, wherein the control device transmits the determined frequency characteristic over the computer network to a memory device for storage and/or retrieves from the memory device over the computer network for determining the evaluation and/or values for permissible and impermissible evaluations.

14. The method of claim 1, wherein the machine is embodied as a production machine or a machine tool.

15. A system program for a control device of a machine, wherein the system program is embodied on a non-transitory storage medium and comprises machine code which when loaded into a memory of the control device and executed by the control device, causes the control device to:
control a first actuator of the machine with a controller structure implemented in the control device of the machine, wherein the first actuator is embodied as a position-controlled or speed-controlled axis;
cyclically specify to the controller structure, both in a normal operating mode and in a special operating mode of the machine, a setpoint value for an action to be executed by the first actuator selected from a sequence of setpoint values; wherein in the normal operating mode, the setpoint value is determined with the control device using a utility program and, in the special operating mode, the setpoint value is determined using a system program different from the utility program;
accept with the controller structure the specified setpoint value and an actual value for the action executed by the first actuator, determine from the specified setpoint value and the actual value a control signal for the first actuator, and control the first actuator according to the determined control signal; and
in the special operating mode, capture the actual values corresponding to the sequence of setpoint values, determine a frequency characteristic for the first actuator from the sequence of setpoint values specified in the special operating mode and associated captured actual values, determine based on the frequency characteristic and on parameters of the controller structure, an evaluation for the first actuator and/or of the controller structure, and decide depending on the evaluation whether to transmit a message, and, if applicable, which type of message, to an operator of the machine or to a computing device over a computer network.

16. A control device for a machine, wherein the control device is programmed with a system program embodied on a non-transitory storage medium and comprising machine code which when loaded into a memory of the control device and executed by the control device causes the control device to:
control a first actuator of the machine with a controller structure implemented in the control device of the machine, wherein the first actuator is embodied as a position-controlled or speed-controlled axis;
cyclically specify to the controller structure, both in a normal operating mode and in a special operating mode of the machine, a setpoint value for an action to be executed by the first actuator selected from a sequence of setpoint values; wherein in the normal operating mode, the setpoint value is determined with the control device using a utility program and, in the special operating mode, the setpoint value is determined using a system program different from the utility program;
accept with the controller structure the specified setpoint value and an actual value for the action executed by the first actuator, determine from the specified setpoint value and the actual value a control signal for the first actuator, and control the first actuator according to the determined control signal; and
in the special operating mode, capture the actual values corresponding to the sequence of setpoint values, determine a frequency characteristic for the first actuator from the sequence of setpoint values specified in the special operating mode and associated captured actual values, determine based on the frequency characteristic and on parameters of the controller structure, an evaluation for the first actuator and/or of the controller structure, and decide depending on the evaluation whether to transmit a message, and, if applicable, which type of message, to an operator of the machine or to a computing device over a computer network.

17. A machine, such comprising:
a first actuator embodied as a position-controlled or speed-controlled axis; and
a control device comprising a controller structure controlling the first actuator, wherein the control device is configured to:
cyclically specify to the controller structure, both in a normal operating mode and in a special operating mode of the machine, a setpoint value for an action to be executed by the first actuator selected from a sequence of setpoint values, wherein in the normal operating mode, the setpoint value is determined with the control device using a utility program and, in the special operating mode, the setpoint value is determined using a system program different from the utility program;
accept with the controller structure the specified setpoint value and an actual value for the action executed by the first actuator, determine from the specified setpoint value and the actual value a control signal for the first actuator, and control the first actuator according to the determined control signal; and
in the special operating mode, capture the actual values corresponding to the sequence of setpoint values, determine a frequency characteristic for the first actuator from the sequence of setpoint values specified in the special operating mode and associated captured actual values, determine based on the frequency characteristic and on parameters of the controller structure, an evaluation for the first actuator and/or of the controller structure, and decide depending on the evaluation whether to transmit a message, and, if applicable, which type of message, to an operator of the machine or to a computing device over a computer network.

18. The machine of claim 17, wherein the machine is embodied as a production machine or a machine tool.

* * * * *